3,169,940
METHOD FOR MAKING CROSS-LINKED COPOLYMERS OF ETHYLENE AND DIALKYL VINYLPHOSPHONATES
Nathan L. Zutty, Charleston, W. Va., assignor to Union Carbide Corporation, a corporation of New York
No Drawing. Filed Dec. 15, 1961, Ser. No. 159,756
6 Claims. (Cl. 260—41)

This invention relates to novel ethylene copolymers. More particularly, this invention relates to copolymers of ethylene and a dialkyl vinylphosphonate. This invention further relates to ethylene-containing polymers that can be cross-linked solely by heating, whereby ethylene-containing polymers having improved dimensional stability are obtained.

The copolymers of this invention contain from about 50 to about 99.5 weight percent polymerized ethylene and from about 50 to about 0.5 weight percent of polymerized dialkyl vinylphosphonate, as hereinafter defined. It is a desirable feature of these copolymers that they can be cured or cross-linked solely by the application of heat, without the utilization of catalysts or high energy radiation previously used in cross-linking ethylene polymers. Thus, the copolymers of this invention can be fabricated into films, rods, sheets, and the like according to conventional procedures, such as injection molding, extrusion molding, calendering, blow molding, compression molding, casting, and the like to form articles which thereafter can be subjected to a post-fabrication heat cure, whereby articles are obtained which have a higher degree of dimensional stability than do articles produced from polyethylene.

In general, the copolymers of this invention are produced by copolymerizing ethylene and a dialkyl vinylphosphonate in contact with a free-radical catalyst at high pressures, employing batch, semi-continuous, or continuous processes according to methods known to one skilled in the art.

The dialkyl vinylphosphonates which can be copolymerized with ethylene to form the copolymers of this invention are represented by the formula:

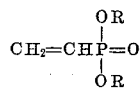

wherein each R is an alkyl radical or a halogen-substituted alkyl radical having from 1 to about 5 carbon atoms, such as methyl, ethyl, propyl, isopropyl, butyl, tert-butyl, pentyl, chloromethyl, 2-chloroethyl, 1,1-dichloroethyl, 1,1,2-trichloroethyl, 2-bromoethyl, 2-fluoroethyl, 2-iodoethyl, 5-chloropentyl, and the like. As examples of suitable dialkyl vinylphosphonates, one can mention dimethyl vinylphosphonate, diethyl vinylphosphonate, dipropyl vinylphosphonate, diisopropyl vinylphosphonate, dipentyl vinylphosphonate, bis(chloromethyl) vinylphosphonate, bis(1-chloroethyl) vinylphosphonate, bis(2-chloroethyl) vinylphosphonate, bis(1,1-dichloroethyl) vinylphosphonate, bis(1,1,2-trichloroethyl) vinylphosphonate, bis(5-chloropentyl) vinylphosphonate, bis(1-bromoethyl) vinylphosphonate, bis(2-bromoethyl) vinylphosphonate, and the like. Bis(2-chloroethyl) vinylphosphonate is a particularly preferred comonomer.

There can be from about 0.5 or less to about 20 or more weight percent of the dialkyl vinylphosphonate and from about 99.5 or more to about 80 weight percent or less of ethylene in the charge, based upon the total weight of the comonomers.

By "free-radical catalyst" is meant a catalyst which produces a free radical under the polymerization conditions employed, such as compounds containing an —O—O— or an —N=N— linkage, and alkyl boron compounds in the presence of oxygen. As examples of free-radical type catalysts one can mention oxygen; hydrogen peroxide; acyl and aroyl peroxides, such as perbenzoic acid, dibenzoyl peroxide, peracetic acid, diacetyl peroxide, perlauric acid, dilauroyl peroxide, acetyl benzoyl peroxide, and the like; alkyl peroxides, such as dimethyl peroxide, diethyl peroxide, di-tert-butyl peroxide, tert-butyl hydroperoxide, ethyl propyl peroxide, and the like; alkali metal persulfates, perborates, and percarbonates; isopropyl percarbonate; azo compounds, such as azo-bis-isobutyronitrile, dimethylazodiisobutyrate, and the like; and mixtures of oxygen and alkyl boron compounds, such as tri-n-butyl boron, and the like; etc. The free-radical catalysts can be employed in the charge in an amount varying from about 0.0001 weight percent to about 5 weight percent of the total weight of the comonomers in the charge, with from about 0.001 weight percent to about 1 weight percent preferred. When oxygen or peroxides are employed, however, they are preferably employed in amounts varying from about 0.01 to about 0.2 weight percent, based upon the total weight of the comonomers.

The copolymerization can be conducted in the presence of a liquid diluent if desired, such as water, heptane, isooctane, cyclohexane, methylcyclohexane, benzene, toluene, chlorobenzene, tert-butanol, butyl acetate, and the like, as well as mixtures thereof.

The copolymerization is conducted at a temperature that is at or above the activation temperature of the catalyst employed. For example, temperatures greater than about 25° C. are employed when isopropyl percarbonate is the catalyst, while temperatures of at least 70° C. are employed when dibenzoyl peroxide is the catalyst. In general, however, temperatures of from about 40° C. or lower to about 350° C. or higher are employed, with temperatures of from about 70° C. to about 250° C. preferred, and temperatures of from about 90° C. to about 140° C. most preferred. At temperatures higher than about 140° C., the reaction period should be as short as possible to prevent substantial cross-linking of the ethylene/dialkyl vinylphosphonate copolymer during polymerization. Thus, continuous copolymerization processes in tubular reactors are preferably employed at these temperatures. The copolymerization generally is conducted at pressures of from about 10,000 p.s.i.g. to about 100,000 p.s.i.g., with pressures of from about 15,000 p.s.i.g. to about 45,000 p.s.i.g. preferred. The copolymers of this invention are recovered by procedures well known in the art.

In general, the melt index of the copolymers of this invention, when produced as above and as measured according to ASTM D1238–57T, are from about 0 to about 3000 decigrams per minute or more, with a melt index of from about 21 to about 1500 decigrams per minute preferred.

The ethylene/dialkyl vinylphosphonate copolymers, when produced as described above, consist essentially of chains containing —CH$_2$CH$_2$— groups and groups of the formula:

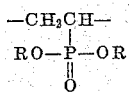

wherein R is as previously defined. These copolymers, when heated, cross-link through the pendant dialkyl phosphonate group. This cross-linking can be carried out at temperatures of from about 130° C., or lower, to about 350° C., or higher, with temperatures of from about 180° C. to about 300° C. preferred. It is to be noted that this temperature range overlaps that at which the copolymerization of ethylene and the vinylphosphonic acid ester is conducted. Thus, the copolymers, as produced by the free-radical copolymerization, may be cross-linked to some degree, depending upon the particular temperature and contact time employed. Even if the copolymers of this invention, as initially produced, are cross-linked, they may be further cross-linked by a subsequent heat cure to modify physical properties, such as softening point, dimensional stability, and the like. The heat curing step of this invention shows its greatest advantages, however, where the copolymer, as produced, is substantially linear, and there is little or no initial cross-linking. By the term "substantially linear" is meant a copolymer which, when a 5-gram sample is heated in 100 cc. of a refluxing solvent, such as xylene, for about 30 minutes, shows complete solution. Such a copolymer is readily fabricated according to conventional methods, such as calendering, injection molding, and the like, to form articles which then can be subjected to a post-fabrication heat cure to cross-link the copolymer and thus impart improved physical properties thereto.

The copolymers of this invention can be cross-linked alone or in admixture with up to about 75 weight percent or more of the well-known inorganic fillers, such as titanium dioxide, silicon dioxide, clay, barium sulfate, calcium carbonate, magnesium chloride, carbon black, and the like, or with other polymeric materials, such as polyethylene, and the like. The utilization of alkaline fillers is particularly desirable, for alkaline compounds catalyze the cross-linking, thereby permitting low curing temperatures and shorter curing times. The fillers can be incorporated with the ethylene/dialkyl vinylphosphonate copolymer by methods known to those skilled in the art, such as milling and the like.

The following examples are illustrative. The physical properties of the copolymers of each example were measured according to the following procedures:

(1) Melt index was measured with a Slocomb Grader Melt Indexer according to ASTM D1238–57T.

(2) Tensile strength and percent elongation were measured according to ASTM D882–56T.

(3) The secant stiffness modulus (stiffness modulus) was determined employing the procedure of ASTM D638–60T and was calculated by dividing the stress by 1% of the strain and multiplying the quotient by 100.

EXAMPLE I

A mixture containing 92.6 weight percent ethylene and 7.4 weight percent bis(2-chloroethyl) vinylphosphonate, 6.1 weight percent toluene, based upon the total weight of the comonomers, and 0.04 weight percent dibenzoyl peroxide, based on the total weight of the comonomers, was compressed to 35,000 p.s.i.g. and continuously fed through the inlet valve of a tubular reactor. The reaction was conducted at a pressure of 35,000 p.s.i.g. and a temperature of 125° C., employing a residence time of about 1 minute. A total of 490 grams of an ethylene/bis(2-chloroethyl) vinylphosphonate copolymer was recovered. Chlorine analysis of the copolymer indicated that there was 25.8 weight percent copolymerized bis(2-chloroethyl) vinylphosphonate in the copolymer.

The physical properties of the copolymers are as follows:

| | |
|---|---|
| Melt index, dg./min. | 28 |
| Tensile strength, p.s.i. | 937 |
| Percent elongation | 195 |
| Stiffness modulus, p.s.i. | 13,793 |

EXAMPLE II

A charge containing 20 grams of bis(2-chloroethyl) vinylphosphonate, 0.4 gram of benzoyl peroxide, and 600 grams of benzene was placed in a 1480-ml., high pressure, stirrer-equipped autoclave. The autocalve was sealed and purged of air by pressurizing the autoclave to 50 p.s.i.g. three times with oxygen-free ethylene and venting the autoclave to atmospheric pressure. Oxygen-free ethylene was admitted to the autoclave to a pressure of 5000 p.s.i.g., the charge was heated to 90° C., and additional ethylene was admitted to a pressure of 15,000 p.s.i.g., corresponding to about 454 grams of ethylene present in the autoclave (95.7 weight percent of the total weight of the comonomers). The autoclave was sealed and the temperature and pressure were maintained at 90° C. and 15,000 p.s.i.g., respectively, for 5 hours, after which the reaction mixture was cooled to room temperature and unreacted ethylene was vented from the autoclave. The ethylene/bis(2-chloroethyl) vinylphosphonate copolymer that had formed was removed from the autoclave and was washed by placing the copolymer in three liters of methanol, stirring, and filtering the copolymer from the methanol. This washing was repeated twice. After drying for about 18 hours at 50° C. the ethylene/bis(2-chloroethyl) vinylphosphonate copolymer weighed 35.5 grams. Chlorine analysis of the ethylene/bis(2-chloroethyl) vinylphosphonate copolymer indicated that there was 29.2 weight percent copolymerized bis(2-chloroethyl) vinylphosphonate in the copolymer. The reduced viscosity of the copolymer was 0.3, as determined from a solution of 0.2 gram of the copolymer in 100 milliliters of benzene at 30° C. The physical properties of the ethylene/bis(2-chloroethyl) vinylphosphonate copolymer are as follows:

| | |
|---|---|
| Melt index, dg./min. | 457 |
| Tensile strength, p.s.i. | 624 |
| Percent elongation | 123 |
| Stiffness modulus, p.s.i. | 6,106 |

EXAMPLE III

Employing procedures similar to that described in Example II, a copolymer of ethylene and bis(2-chloroethyl) vinylphosphonate was produced that had 43.0 weight percent copolymerized bis(2-chloroethyl) vinylphosphonate in the copolymer and had the following physical properties:

| | |
|---|---|
| Melt index, dg./min. | 1,290 |
| Tensile strength, p.s.i. | 385 |
| Percent elongation | 43 |
| Stiffness modulus, p.s.i. | 5,191 |

In a similar manner a copolymer of ethylene and bis(chloromethyl) vinylphosphonate is produced by substituting bis(chloromethyl) vinylphosphonate for bis(2-chloroethyl) vinylphosphonate; a copolymer of ethylene and bis(5-chloropentyl) vinylphosphonate is produced by substituting bis(5-chloropentyl) vinylphosphonate for bis(2-chloroethyl) vinylphosphonate; and a copolymer of ethylene and bis(2-bromoethyl) vinylphosphonate is produced by substituting bis(2-bromoethyl) vinylphosphonate for bis(2-chloroethyl) vinylphosphonate.

EXAMPLE IV

Plaques of the ethylene/bis(2-chloroethyl) vinylphosphonate copolymers produced according to Examples I, II, and III measuring 3 inches in diameter and 0.020 inch thick were molded at 120° C. and 850 p.s.i., and then were cured at 220° C. The physical properties of the uncured and cured copolymers, as determined from test samples measuring 1 inch x 0.25 inch by 0.020 inch cut from these plaques, are set forth in Table A.

*Table A.—Heat cured ethylene/bis(2-chloroethyl) vinylphosphonate copolymers*

| Weight Percent Phosphonate in Copolymer | Minutes Cured at 220° C. | Melt Index, dg./min. | Tensile Strength, p.s.i. | Percent Elongation | Stiffness Modulus, p.s.i. |
|---|---|---|---|---|---|
| 25.8 [1] | 0 | 28 | 937 | 195 | 13,793 |
|  | 15 | 0.7 | 1,581 | 538 | 11,858 |
|  | 30 | 0.32 | 1,660 | 545 | 13,000 |
|  | 60 | 0.02 | 1,676 | 305 | 12,713 |
| 29.2 [2] | 0 | 457 | 624 | 123 | 6,106 |
|  | 10 | 0 | 841 | 683 | 5,516 |
|  | 20 |  | 1,423 | 983 | 5,054 |
|  | 40 |  | 1,480 | 712 | 5,369 |
| 43.0 [3] | 0 | 1,290 | 385 | 43 | 5,191 |
|  | 15 | 30 | 511 | 488 | 4,484 |
|  | 30 |  | 520 | 495 | 4,126 |
|  | 60 |  | 766 | 450 | 5,066 |

[1] Copolymer of Example I.
[2] Copolymer of Example II.
[3] Copolymer of Example III.

From Table A it can be seen that heating the copolymers of this invention results in an increase in the molecular weight of the copolymers (as shown by the decrease in melt index), an increase in the tensile strength of the copolymers, an increase in the percent elongation to a maximum, after which the percent elongation decreases with further curing, and a slight decrease in the stiffness modulus.

EXAMPLE V

Samples of the ethylene/bis(2-chloroethyl) vinylphosphonate copolymer produced according to Example I were blended with titanium dioxide, calcium carbonate, and two grads of carbon black ((a) particle size of 472 mμ, pH=7.4; (b) particle size of 43 mμ, pH=8.5) to produce compositions containing 50 parts of filler per 100 parts of the copolymer. The compositions were compounded on a two-roll mill at temperatures of less than 100° C. The resulting compositions were molded into 3-inch diameter by 0.020 inch thick plaques at a pressure of 850 p.s.i. and a temperature of 120° C., and the plaques were cured at a temperature of 220° C. for 60 minutes. The physical properties of the resulting cured compositions are set forth in Table B, together with the properties of a heat cured sample of the unfilled copolymer for purposes of comparison.

*Table B.—Effect of fillers on ethylene/bis(2-chloroethyl) vinylphosphonate copolymer*

| Filler | Tensile Strength, p.s.i. | Percent Elongation | Stiffness Modulus, p.s.i. |
|---|---|---|---|
| None | 1,676 | 305 | 12,713 |
| Titanium Dioxide | 1,984 | 205 | 18,076 |
| Calcium Carbonate | 4,225 | 30 | 69,734 |
| Carbon Black (a) | 1,773 | 165 | 22,658 |
| Carbon Black (b) | 1,862 | 40 | 27,806 |

From Table B it can be seen that the inclusion of fillers in the copolymers of this invention resulted in compositions having improved tensile strength over the unfilled copolymer, as well as increased the stiffness modulus.

The catalytic effect of alkaline fillers can be seen from the calcium carbonate-filled copolymer, which has markedly greater tensile strength and stiffness modulus than do the other compositions. Furthermore, the smaller-sized carbon black (b) imparted a higher tensile strength and stiffness modulus than did the larger-size carbon black (a). Thus, it can be seen that the physical properties of the cured copolymers of this invention can be varied as desired by the selection of the type of filler, the particle size, the basicity of the filler, and the amount of filler used.

EXAMPLE VI

Blends of low-density polyethylene and the ethylene/bis(2-chloroethyl) vinylphosphonate copolymer produced according to Example I were produced according to the procedure of Example V, which blends contained 33.3 weight percent or 50 weight percent of polyethylene, based on total blend weight. Plaques molded using the blends and the unmodified polyethylene were cured according to the procedure described in Example V. The physical properties of the blends and of the polyethylene alone are set forth in Table C.

*Table C.—Polyethylene-ethylene/bis(2-chloroethyl) vinylphosphonate copolymer blends*

| Weight Percent Polyethylene | Minutes Cured at 220° C. | Melt Index, dg./min. | Tensile Strength, p.s.i. |
|---|---|---|---|
| 33.3 | 0 | 6.0 | 1,546 |
| 33.3 | 15 | 2.1 | 1,748 |
| 33.3 | 60 | 0.05 | 1,463 |
| 50 | 0 | 9.78 | 1,530 |
| 50 | 15 | 0.64 | 1,708 |
| 50 | 60 | 0.08 | 1,560 |
| 100 | 60 | 2.0 | 1,600 |

From Table C it can be seen that the polyethylene-ethylene/bis(2-chloroethyl) vinylphosphonate copolymer blends are readily cross-linked to form a material having a melt index that is lower than that of polyethylene alone, while tensile strength is relatively unaffected.

EXAMPLE VII

By employing procedures similar to that described in Example II, a copolymer of ethylene and diethyl vinylphosphonate is readily produced by heating ethylene and diethyl vinyl phosphonate at 90° C. and 15,000 p.s.i.g. in the presence of a free-radical catalyst. The resulting copolymer is readily cross-linked by heating at about 220° C.

In a similar manner, a copolymer of ethylene and dipentyl vinylphosphonate is produced and crosslinked by substituting dipentyl vinylphosphonate for diethyl vinylphosphonate.

What is claimed is:
1. The process for producing a cross-linked copolymer of ethylene and a dialkyl vinylphosphonate which comprises heating at 130° C. to 350° C. a substantially linear copolymer containing from 50 to 99.5 weight percent polymerized ethylene and from 50 to 0.5 weight percent of a polymerized dialkyl vinylphosphonate of the formula:

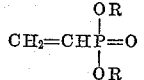

wherein R is a member selected from the group consisting of alkyl of from 1 to 5 carbon atoms and halogen substituted alkyl of from 1 to 5 carbon atoms for a period of time sufficient to produce said cross-linked resin.
2. The process for producing a cross-linked polymer of ethylene and a dialkyl vinylphosphonate composition as claimed in claim 1 wherein said dialkyl vinylphosphonate is bis(2-chloroethyl) vinylphosphonate.
3. The process for producing a cross-linked copolymer of ethylene and a dialkyl vinylphosphonate which comprises heating at 130° C. to 350° C. a mixture of a substantially linear copolymer containing from 50 to 99.5 weight percent polymerized ethylene and from 50 to 0.5 weight percent of a polymerized dialkyl vinylphosphonate of the formula:

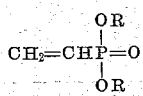

wherein R is a member selected from the group consisting of alkyl of from 1 to 5 carbon atoms and halogen substituted alkyl of from 1 to 5 carbon atoms, and up to 75 weight percent, based on the weight of said linear copolymer, of an alkaline, inorganic filler, for a period of time sufficient to produce said crosslinked polymer.

4. The process of claim 3 wherein said alkaline filler is calcium carbonate.

5. The product produced by the process of claim 3.

6. The product produced by the process of claim 4.

References Cited in the file of this patent

UNITED STATES PATENTS 2,956,952    Fitzgerald et al. _____ Oct. 18, 1960
2,980,721    McMasters et al. _____ Apr. 18, 1961

OTHER REFERENCES

"Polythene" (Renfrew and Morgan), published by Interscience Publishers Inc. (New York), 1957 (page 44 relied on).

"Vinyl and Related Polymers" (Scheldknecht), published by John Wiley & Sons, Inc. (New York), 1952 (page 71 relied on).

Chemical Abstracts, vol. 42, p. 4132h (1948).